Jan. 27, 1925.
L. L. DE RUYTER
1,524,342
BRAKE ATTACHMENT
Filed Dec. 2, 1922    3 Sheets-Sheet 1
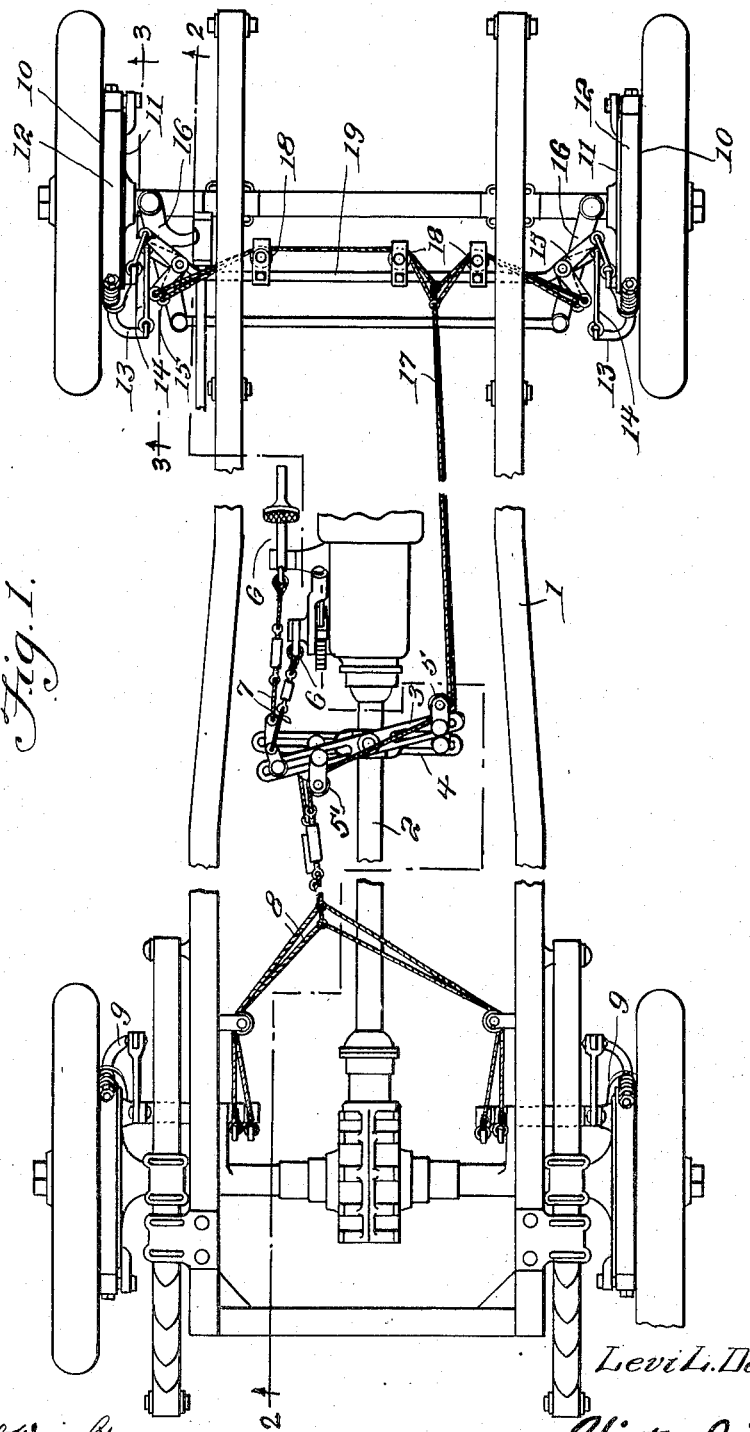

Jan. 27, 1925.
L. L. DE RUYTER
BRAKE ATTACHMENT
Filed Dec. 2, 1922
1,524,342
3 Sheets-Sheet 2
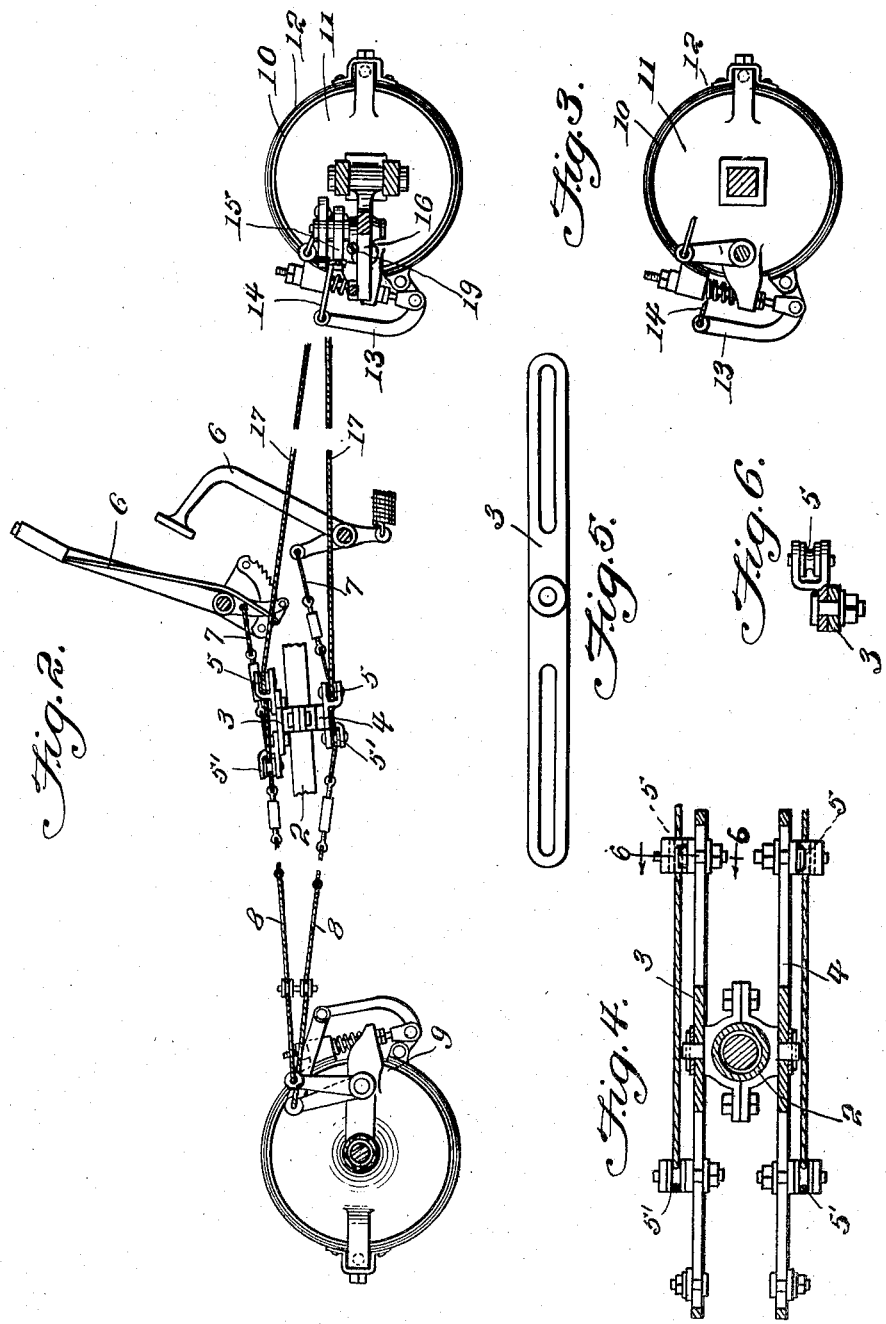
Levi L. De Ruyter
INVENTOR
BY Victor J. Evans
ATTORNEY
WITNESS:

Jan. 27, 1925.
L. L. DE RUYTER
1,524,342
BRAKE ATTACHMENT
Filed Dec. 2, 1922
3 Sheets-Sheet 3
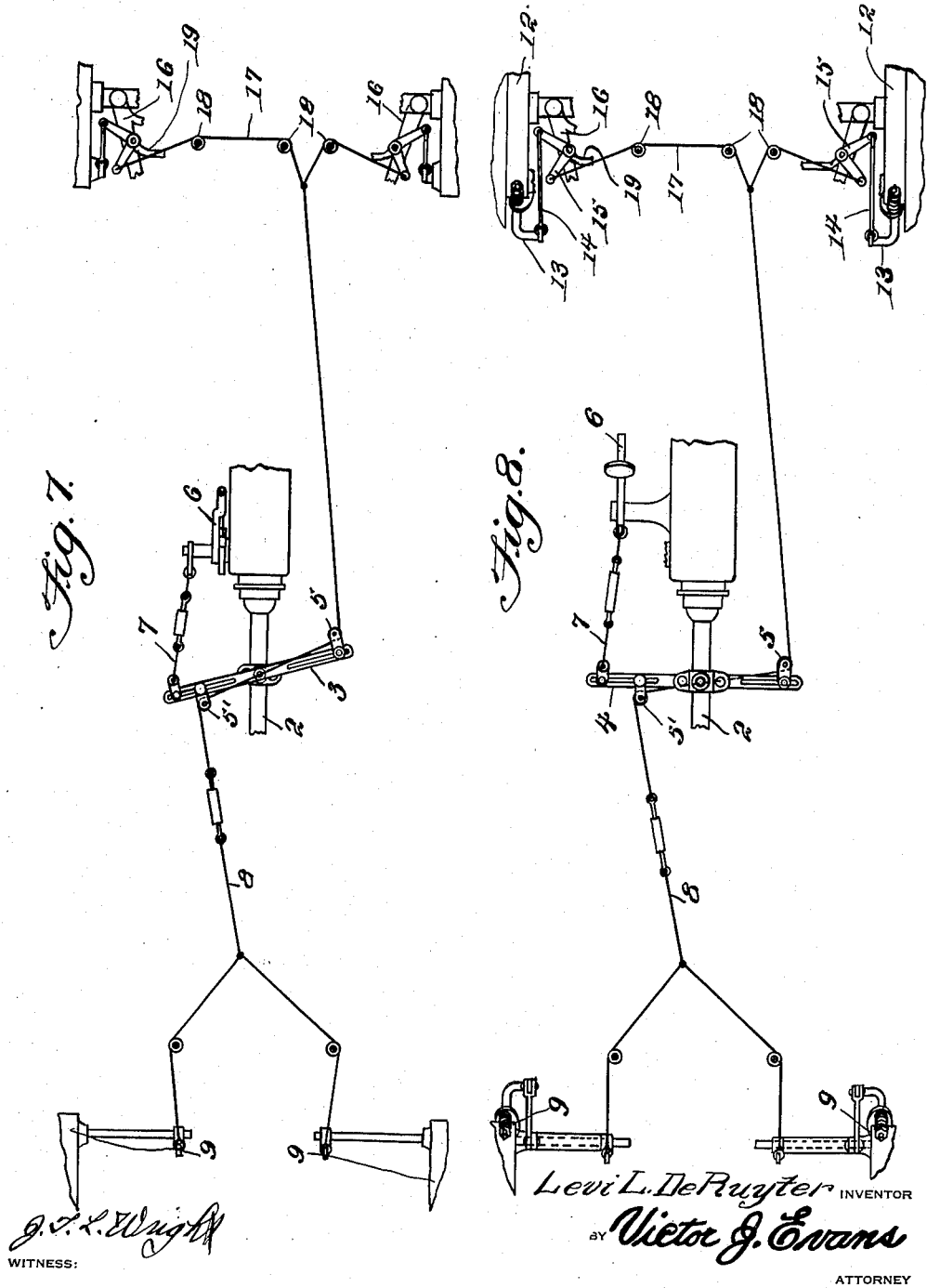

Patented Jan. 27, 1925.

1,524,342

UNITED STATES PATENT OFFICE.

LEVI L. DE RUYTER, OF ANIWA, WISCONSIN.

BRAKE ATTACHMENT.

Application filed December 2, 1922. Serial No. 604,549.

*To all whom it may concern:*

Be it known that I, LEVI L. DE RUYTER, a citizen of the United States, residing at Aniwa, in the county of Shawano and State of Wisconsin, have invented new and useful Improvements in Brake Attachments, of which the following is a specification.

This invention relates to a brake attachment for motor vehicles, the general object of the invention being to provide brakes for the front wheel as well as the rear wheels so that the vehicle can be stopped very quickly.

Another object of the invention is to so arrange the parts at the front of the vehicle that they will not interfere with the steering of the car and the brakes will act on corners the same as straight sections of the road.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a plan view of the chassis of a motor vehicle showing my invention in use.

Figure 2 is a diagrammatic view taken approximately on the line 2—2 of Figure 1.

Figure 3 is a section on line 3—3 of Figure 1.

Figure 4 is a sectional view taken through the drive shaft housing and showing the equalizer bars 3 and 4 partly in section.

Figure 5 is a view of one of the equalizer bars.

Figure 6 is a section on line 6—6 of Figure 4.

Figures 7 and 8 are diagrammatic views showing the operation of the invention.

In these views 1 indicates the chassis of the vehicle and 2 indicates the drive shaft housing. A pair of equalizer bars 3 and 4 are pivotally secured to the housing 2, these bars carrying the pulleys 5. Hand and foot levers are shown at 6 and these levers are connected with the bars 3 and 4 by the adjustable cables 7. Cables 8 also adjustably connect the pulleys 5' on the equalizer bars with the brake mechanism 9 on the rear wheels, this mechanism being of the usual or any desired type. A brake drum 10 is connected with each of the front wheels and a support 11 is connected with each spindle of each front wheel and brake bands 12 are connected with the supports and engage the drum 10. The operating arms 13 of these bands pass through holes in the supports and these arms are connected by the rods 14 with the bell cranks 15 which are pivoted to the arms 16 of the steering mechanism. Cables 17 are connected with the bell cranks and these cables pass to the pulleys 5 on the equalizing bars to which they are secured. The cables pass over suitable guiding pulleys 18 which are carried by a bar 19 which is supported in a suitable manner by the arms 16 of the vehicle.

From the foregoing it will be seen that by depressing the foot levers both the front and rear brakes will be applied, one pedal acting as a service brake and the other as an emergency brake. As all four wheels are braked it will be seen that the vehicle can be easily and quickly brought to a stop and the arrangement of parts at the front of the vehicle is such that the brakes can be applied without interfering with the steering of the vehicle.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In a motor vehicle, brake mechanism carried by the rear wheels, a pair of equalizer bars, cables connecting the same with the said mechanism, a pair of manually operated members, one of which is connected with each equalizer bar, a support carried by each of the front spindles, brake mechanism carried by each of the front wheels, portions of which are carried by the supports, a pair of bell crank levers on each steering arm, cables connecting the same with the brake mechanism and cables connecting the bell cranks with the equalizer bars.

In testimony whereof I affix my signature.

LEVI L. DE RUYTER.